United States Patent
Rao

(10) Patent No.: US 7,339,985 B2
(45) Date of Patent: Mar. 4, 2008

(54) ZERO CROSSING METHOD OF SYMBOL RATE AND TIMING ESTIMATION

(75) Inventor: Yong Rao, Round Rock, TX (US)

(73) Assignee: National Instruments Corporation, Austin, TX (US)

( * ) Notice: Subject to any disclaimer, the term of this patent is extended or adjusted under 35 U.S.C. 154(b) by 783 days.

(21) Appl. No.: 10/338,534

(22) Filed: Jan. 8, 2003

(65) Prior Publication Data

US 2004/0131113 A1 Jul. 8, 2004

(51) Int. Cl.
*H04L 7/00* (2006.01)

(52) U.S. Cl. .............. 375/226; 375/354

(58) Field of Classification Search .......... 375/326, 375/82, 230, 355, 344, 341, 226, 224, 316, 375/354; 329/107

See application file for complete search history.

(56) References Cited

U.S. PATENT DOCUMENTS

| | | | | |
|---|---|---|---|---|
| 4,570,126 A * | 2/1986 | Demmer et al. | ............. | 329/327 |
| 4,707,841 A * | 11/1987 | Yen et al. | ............. | 375/230 |
| 5,262,714 A * | 11/1993 | Friedman | ............. | 324/76.42 |
| 6,366,629 B1 | 4/2002 | Chen et al. | | |
| 6,795,496 B1 * | 9/2004 | Soma et al. | ............. | 375/226 |
| 2001/0012320 A1 * | 8/2001 | Watanabe et al. | ............. | 375/226 |
| 2002/0163958 A1 * | 11/2002 | Yamaguchi et al. | ............. | 375/226 |
| 2003/0030426 A1 | 2/2003 | Pickerd | | |
| 2003/0081667 A1 * | 5/2003 | Camnitz et al. | ............. | 375/226 |
| 2003/0097231 A1 * | 5/2003 | Cheng | ............. | 702/108 |
| 2003/0165208 A1 * | 9/2003 | Carter et al. | ............. | 375/373 |
| 2003/0202573 A1 * | 10/2003 | Yamaguchi et al. | ............. | 375/226 |
| 2003/0224801 A1 * | 12/2003 | Lovberg et al. | ............. | 455/454 |

OTHER PUBLICATIONS

Simulink Manual, Model-Based and System-Based Design, Using Simulink Version 5, 7 pages, Jul. 2002.

* cited by examiner

*Primary Examiner*—Kevin Burd
(74) *Attorney, Agent, or Firm*—Meyertons Hood Kivlin Kowert & Goetzel, P.C.; Jeffrey C. Hood

(57) ABSTRACT

System and method for analyzing communication signals. A digital signal comprising multiple samples is received, representing a plurality of binary symbols. Zero crossings of the signal are determined, each comprising a respective first sample immediately preceding the zero crossing and a respective second sample immediately following the zero crossing. Per zero crossing, an error expression is determined interpolating between the first and second samples as a function of estimated period T and estimated offset $\tau$ of the signal. Based on the error expressions, values of T and $\tau$ are determined using a linear fit that minimizes a total error of values of the error expressions. T and $\tau$ are usable in analyzing the signal, e.g., each zero crossing corresponds to a respective symbol represented by a respective segment of the signal. The segments are overlaid based on T and $\tau$, forming an eye diagram usable to analyze the signal.

20 Claims, 6 Drawing Sheets

ZERO CROSSING METHOD OF SYMBOL RATE AND TIMING ESTIMATION

FIELD OF THE INVENTION

The present invention relates generally to digital signal analysis, and more particularly, to the estimation of symbol rate and timing for a digital signal.

DESCRIPTION OF THE RELATED ART

Signal communications have become central to many aspects of the modern world. In fact, virtually all modern business, manufacturing, engineering, and scientific enterprises rely substantially on signal communications to perform their activities. To support this ubiquitous phenomenon, a vast and varied technological infrastructure has been, and continues to be, developed, including wireless and wired telecommunications media, fiber-optic components, routers, transmitters, analog and digital signal processing chips, and myriad software programs for managing, processing, analyzing, and transmitting these signals, among others. These communications related components generally require testing and diagnostic analysis to ensure proper behavior and/or design, as well as calibration and tuning for particular applications.

The ever-increasing speeds of data and communication signals result in new or changing design and test challenges—including the increased likelihood of pattern-dependent failures. As bit rates increase to 10 Gb/s and beyond, pattern-dependent failures become much more common in the generation, transmission, and reception of signals in various data and communication products and systems. Unfortunately with traditional test technologies, it is often difficult and time-consuming to reliably identify and observe these failures. Bit error rate testers can be used to determine the total number of bit failures in the generated bit stream, but may not identify the specific patterns that caused the failures.

In the field of high-speed communications, where signal frequencies may extend into the multi-gigahertz range, analysis of chips and/or other hardware components is generally performed by high-performance digital sampling instruments, such as the 86100B Infiniium DCA Wide-Bandwidth Oscilloscope, made by Agilent Technologies, or the CSA 8000 digital sampling oscilloscope, made by Tektronix. These devices may be capable of numerically processing tens of thousands of bits to analyze signals characterizing the behavior of communication components, for example, high-speed optical transmitters operating in the 100 Mb/s-40 Gb/s range.

Eye-diagrams are a common way to analyze the performance of high-speed communication systems and are the primary tool for most digital communication analysis. Eye-diagrams are generated by transmitting random digital communication signals into a communication medium (optical fiber, co-axial cable, air/wireless, etc.) and sampling the output on a high-speed sampling oscilloscope. The oscilloscope is typically triggered externally from a reference clock signal from the transmitter (via a phased locked loop). The resulting pattern on the oscilloscope is the jittered digital pattern signals superimposed on each other. Over successive sweeps, the random bit patterns build up a composite picture of all the possible pattern sequences and transitions (low to low, high to high, high to low, and low to high). An example of an eye-diagram is described below with reference to FIG. 1.

Through analysis of an eye-diagram one may determine network and communication variables such as jitter, noise, pulse degradation, and intersymbol interference, among others. Eye-diagram analysis may also facilitate mask testing. Specific parameters that can be determined from the eye-diagram include, but are not limited to, extinction ratio, eye height, eye width, signal to noise ratios and Q-factors, duty cycle, bit rate, rise times, fall times, and eye amplitude. These parameters are typically calculated using values like the eye diagram "eye opening" which is the large open area at the center of the pulse, the "eye height" which is the distance between the top and bottom of the pulse, "eye width" which is the distance between the transitions, and crossing points and slopes which are where the pulses meet on each side.

Traditional eye-diagrams are created with high-speed digital sampling oscilloscopes such as the Agilent 86100A wide-bandwidth oscilloscope and the Tektronics CSA8000 communications analyzer. These stand-alone instruments have built in functionality to numerically determine communication performance parameters such as extinction ratio, eye height, eye width, signal to noise ratios, etc., mentioned earlier. Additionally, various software products are available for digital communication analysis and have special math functions to analyze eye-diagram data. For example, SyntheSys Research, Inc. provides digital communication analysis software to Agilent for use in its high-speed oscilloscope.

As one example of the use of eye diagrams, when building transceivers for optical networks, it is necessary to test the transceiver module via an eye diagram to determine if it is performing to specification. If the eye diagram is not acceptable then the transceiver is not operating properly and must be "tuned", or programmed, with new operating parameters. After the transceiver module is programmed with the new operating parameters, eye diagram measurements are made again and performance is analyzed. This eye-diagram analysis and transceiver tuning is repeated until an acceptable eye diagram test is passed.

Another example of the use of eye diagrams relates to standards compliance testing. For example, the Universal Serial Bus (USB), introduced to computers in 1995, now appears in virtually all PCs and in many peripherals. Yet, the bus's 12-Mbit/s speed has limited its usefulness for products such as video cameras and DVD players. However, the USB 2.0 bus, with its 480-Mbits/s rate, promises to become the dominant PC-to-peripheral interface. With the release of the USB 2.0 specification in April 2000, the USB's speed increased 40×, making it fast enough for most PC peripherals. To ensure that USB 2.0 host controllers, hubs, and peripherals (called "devices" in the USB specification) communicate with each other, the USB Implementer's Forum (USB-IF) developed test specifications which complement the USB 2.0 specification by providing uniform test methods that anyone can apply. Before a USB logo may be applied to a product, the product must pass compliance tests. The product tested is generally referred to as a Unit Under Test (UUT).

Some current compliance tests use Matlab scripts, generated using the Matlab development environment from The MathWorks. These scripts analyze data from a product test and produce reports. Because of their high bit rates, USB 2.0 devices require signal integrity not required for low-speed or high-speed devices, thus to perform signal-integrity tests on high-speed signals, an eye diagram may be used. The diagram facilitates measurement of a signal's rise time, fall time, undershoot, overshoot, and jitter, and may reveal problems in terminations of USB data lines.

FIG. 1 is an example of an eye diagram indicating USB high-speed signals operating within specified parameters. The USB 2.0 eye diagram looks like a typical eye diagram used in telecom testing, however, in a typical telecom eye-mask test, an oscilloscope is set for continuous triggering and the oscilloscope builds the diagram over an unlimited number of bits. With a USB 2.0 eye diagram, the test system performs the measurement over one USB data packet (488 bits). After receiving test data from the oscilloscope, testing scripts take the data from each bit period (2.0833 ns) and overlay all bits onto a USB 2.0 eye mask. If the USB 2.0 device's transmitted signals easily fall within the eye-diagram's mask, e.g., outside the truncated diamond-shaped region, then the product will likely pass compliance tests.

FIG. 2 illustrates symbol period T (inverse of the symbol rate) and offset $\tau$ (also referred to as the signal timing) for an exemplary high speed digital signal, where symbol period refers to the duration of a pulse in seconds or samples, and offset refers to the duration of an initial preamble or incomplete symbol that precedes the train of signal pulses under analysis. The signal data is generally in the form of a sequence of samples, such as may be acquired by a data acquisition card coupled to a computer system, where each symbol is represented by a plurality of samples. It should be noted that depending on the response behavior of the circuits involved in transmitting and/or receiving the digital signal, a given pulse's waveform may be affected by previous pulses. For example, in the pulse train shown in FIG. 2, the first fifteen symbols consist of alternating 1s and 0s, i.e., high and low pulses, but the remainder of the symbols are alternating pairs of 1s and 0s, i.e., 1,1,0,0,1,1,0,0, etc., with consequently higher amplitudes (i.e., extrema), and thus, possibly different relative zero crossing points.

As FIG. 2 shows, in this example, the digital signal samples include an initial partial pulse of length $\tau$, where $\tau$ is in units of samples. Thus, the first $\tau$ samples of the signal are considered the preamble of the signal, and may be ignored. As FIG. 2 also shows, each symbol pulse has length or period T, also expressed in number of samples. Thus, the zero crossing point for each high-low or low-high transition between symbols is roughly an integral multiple of T with an offset of $\tau$, i.e., $nT+\tau$, where n counts the successive symbols. Note that when adjacent symbols have the same value, e.g., 0,0 or 1,1, there is not a zero crossing point between them.

FIG. 3A illustrates a typical eye diagram where multiple signal pulses representing digital (binary) symbols are overlaid in accordance with accurate estimates of the symbol period T and offset $\tau$. Said another way, the pulses are aligned according to an estimated zero crossing point. It is noted that in high speed digital communications, even small errors in this estimation, e.g., on the order of a few picoseconds, may degrade an eye diagram to the point of uselessness. FIG. 3B illustrates an eye diagram resulting from inaccurate estimates of symbol period and offset. As FIG. 3B shows, such inaccuracies result in significant spread of relative zero crossing points, rendering the eye diagram substantially useless for analyzing the digital signal. Thus, accurate estimates of symbol period and offset are needed to effectively align signal pulses in eye diagrams.

Prior art approaches to estimating symbol period and offset are typically based on iterative methods, such as minimizing errors in zero crossing times via various well known techniques, e.g., sum of squares, golden section, bi-section, or other minimization techniques. However, these iterative methods are generally fairly complex and computationally expensive, and thus may require significant time to perform. Additionally, the complexity of the iterative algorithms generally results in significant maintenance effort over the lifetime of the implementation program code.

Thus, improved systems and methods for estimating symbol rate and timing are desired.

SUMMARY OF THE INVENTION

Various embodiments of a system and method are presented for estimating symbol rate and timing for a digital signal, e.g., a USB digital signal or other type of digital signal.

In one embodiment, a digital signal may be received and stored in a memory medium of a computer system. The digital signal is preferably a PAM waveform, and may include a plurality of samples. The digital signal may include a plurality of binary symbols, e.g., 1s and 0s, where each symbol is represented by a high (1) or low (0) pulse. For example, in one embodiment, an array of M samples s[M] may represent the digital signal, where each sample s[i] is a measured (sampled) amplitude of the signal. The samples may be generated from an original analog signal by an A/D converter or high-speed digital sampler, as is well known in the art. In one embodiment, the digital signal comprises USB signal data, although other digital communication protocols are also contemplated.

A plurality of zero crossings of the digital signal may be determined, where each of the plurality of zero crossings includes a respective first sample, immediately preceding the zero crossing, and a respective second sample, immediately following the zero crossing. Thus, for a given zero crossing, if the preceding sample is s[i], the following sample is s[i+1]. In a preferred embodiment, T is the nominal symbol period or interval (unit interval) for a symbol (0 or 1) in terms of number of samples, and may be a floating-point value (e.g., T=52.08 samples). The timing, denoted by $\tau$, refers to the offset from the beginning of s[i] to the first symbol in terms of number of samples, and may also be a floating-point value. Thus, $\tau$ may be considered to be the starting point of the first symbol of the digital signal. It should be noted that in some embodiments, $\tau$ can be a negative number (e.g., if s[i] starts in the middle of a symbol). In the case of $\tau$ being negative, $\tau$ may be adjusted by adding T. Thus, the zero crossing point for each high-low or low-high transition between symbols is roughly an integral multiple of $\tau$ with an offset of $\tau$, i.e., $nT+\tau$, where n counts the successive symbols. It is noted that when adjacent symbols have the same value, e.g., 0,0 or 1,1, there is not a zero crossing point between them.

Then, for each of the plurality of zero crossings, an error expression may be determined, where the error expression computes an error between the nominal or intended zero crossings and the actual values interpolated from the first sample and the second sample as a function of an estimated period T and an estimated offset $\tau$ of the digital signal. As is well known in the art, there are various approaches for interpolating between two points. In a preferred embodiment, a simple linear interpolation may be used. Thus, each error expression may be used to compute an error as a function of the estimated period T and offset $\tau$. For example, considering signal amplitude to be along a y-axis and time or samples to be along an x-axis, in one embodiment, the error expression may compute an error in the interpolated amplitude of the signal at the nominal or estimated zero crossing point, i.e., the error along the y-axis (amplitude) of the signal. In another embodiment, the error expression may compute an error in the interpolated zero crossing point, i.e., the error along the x-axis (time or samples) of the signal.

As an example of one implementation, let $N_z$ be the number of zero crossings and let index j refer to each zero crossing: j=0 . . . $N_z$–1. Two $N_z$-length arrays, a[$N_z$] and b[$N_z$] contain values from s[i] that bracket each zero crossing. Let a[j] be the value from s[i] that immediately precedes the jth zero crossing, and b[j] contain the value of s[i] that immediately follows the jth zero crossing.

Additionally, let symbol index array n[j] hold the symbol number (index) at the zero crossing corresponding to the bracket values a[j] and b[j]. In other words, the zero-start symbol immediately after the jth zero crossing is the n[j]th symbol of all the symbols covered by s[i]. Let array idx_a [$N_z$] store the indices of the a[j] samples, i.e., each jth element of idx_a[$N_z$] contains the index into s[i] corresponding to the first bracket value a[j], such that a[j]=s[idx_a[j]]. It should be noted that b[j]=s[idx_a[j]+1].

Now, assuming a linear model for T and τ of the form:

$$y = Tx + \tau, \quad (1)$$

where y may represent the ideal zero crossing time location, and x may represent the symbol count, an expression may be determined for the error between nominal values of the zero crossings and actual values determined from the data, e.g., vialinear interpolation of a[j] and b[j] at location n[j]*T+τ. In one embodiment, the error term alpha for the n[j]th symbol is:

$$alpha[j] = (b[j] - a[j]) * (n[j]*T + \tau - idx\_a[j] + a[j]/(b[j] - a[j])) \quad (2)$$

where alpha[j] denotes the value of the original waveform at time n[j]*T+τ. Note that this error expression has the same form as a weighted linear fit expression, and thus, a weighted linear fit algorithm may be used to solve for T and τ such that the error alpha is minimized, e.g., by minimizing the square of alpha, the absolute value of alpha, etc., as is well known in the art.

It should be noted that in another embodiment, the error expression may assume the form:

$$alpha[j] = n[j]*T + \tau - idx\_a[j] + a[j]/(b[j] - a[j]) \quad (3)$$

where the weighting term (b[j]–a[j]) is omitted. In this embodiment, alpha[j] denotes the error in the estimated zero crossing point on the x-axis. A linear fit algorithm may be used to solve for T and τ such that the error alpha is minimized, as is well known to those skilled in the art.

Thus, once the error expressions for each zero crossing have been determined, values of T and τ may be determined (based on the error expressions) that minimize a total error of values of the expressions. It is noted that there is a wide variety of criteria which may be used to compute the total error, including, but not limited to, median fit, weighted linear fit, and linear least squares regression, among other robust estimation techniques, as is well known from the field of estimation theory.

For example, in an embodiment using a weighted linear fit, the sum of squares of the distance from the interpolated value at n[j]*T+τ to the x-axis may be minimized. In other words, T and τ may be chosen such that $\Sigma(alpha^2)$ is minimized. As is well known by those skilled in the art, in one embodiment, this may be accomplished by summing the squares of the expressions (alphas), setting the partial derivatives of the sum of squares expression (with respect to T and τ, respectively) equal to zero, and solving for T and τ algebraically. Standard equations for any of a variety of minimization techniques are readily available from standard references.

As noted above, the values of T and τ are in time units of samples. Thus, if desired, the values of T and τ may be divided by a sampling frequency of waveform s[i], $F_s$ in units of samples/s, to compute physical timebased values of said T and said τ. In other words, the units of T and τ may be converted from samples to seconds thusly:

symbol period or interval (s)=$T/F_s$ time offset or delay (s)=$\tau/F_s$. (4)

Finally, the determined values of T and τ may be output, where the determined values of T and τ are usable in analyzing the digital signal. For example, the values of T and τ may be output to a display, a log, a memory location, or to an external system, such as a device or other external computer coupled to the computer system.

In one embodiment, the symbol rate for the signal, which is simply the inverse of the period T, may be determined thusly:

symbol rate=1/T (5)

where the units are per sample or per second, depending on the units of T.

As mentioned above, each zero crossing corresponds to a respective symbol of the plurality of symbols. Thus, if substantially accurate values of T and τ are known, the waveform s[i] may be partitioned or broken into segments, starting at τ, with each segment having a duration of T. Each respective symbol is thus represented by a respective segment of the digital signal. In one embodiment, each respective segment may be overlaid based on the determined values of T and τ to form an eye diagram, where the eye diagram is usable to analyze the digital signal. In other words, when each T-length segment is plotted on the same graph, an eye-diagram of the modulated signal may be generated.

As is well known, the resultant eye diagram may be used to compute such attributes of the digital signal as rise time, fall time, jitter RMS (root mean square), jitter p-p, period, frequency, positive/negative pulse width, duty cycle, duty cycle distortion, delta time, extinction ratio, average power, crossing percentage, one/zero levels, eye height, width, and amplitude, Q-factor, bit rate, opening factor, and contrast ratio, among others.

Thus, in various embodiments, the system and method operates to estimate symbol rate (inverse of the symbol period), and timing or offset, of a digital signal. The estimated values may facilitate construction of an eye diagram for the signal which may be used to analyze the signal. Such analysis may be applicable in a variety of fields, including hardware testing and diagnostics, manufacturing, monitoring, quality control, and telecommunications, among others.

BRIEF DESCRIPTION OF THE DRAWINGS

A better understanding of the present invention can be obtained when the following detailed description of the preferred embodiment is considered in conjunction with the following drawings, in which.

Figure 1:
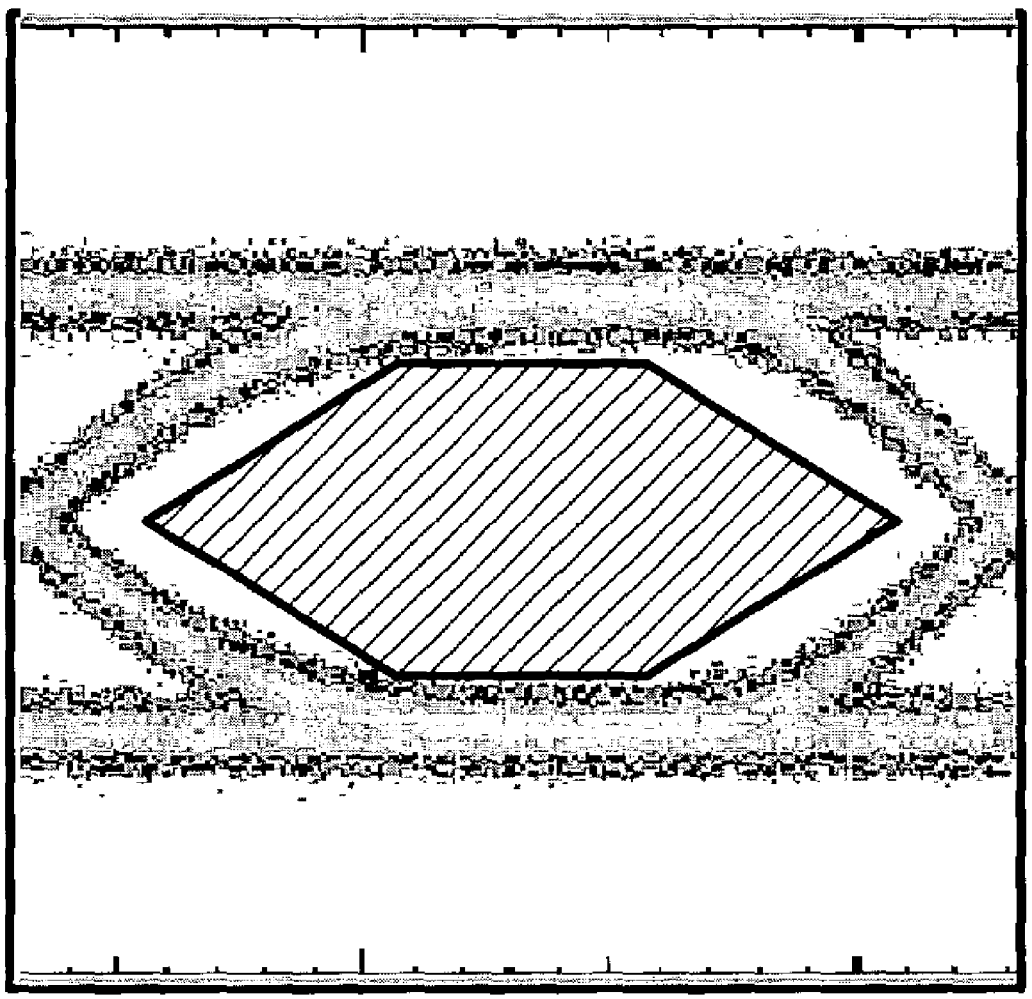
FIG. 1 illustrates an exemplary eye-diagram for performing compliance testing, according to the prior art.

While the invention is susceptible to various modifications and alternative forms specific embodiments are shown by way of example in the drawings and are herein described in detail. It should be understood, however, that drawings and detailed description thereto are not intended to limit the invention to the particular form disclosed. But on the contrary the invention is to cover all modifications, equivalents and alternatives falling within the spirit and scope of the present invention as defined by the appended claims.

DETAILED DESCRIPTION OF THE EMBODIMENTS

Incorporation by Reference

The following publications are hereby incorporated by reference in their entirety as though fully and completely set forth herein:

The Universal Serial Bus (USB) 2.0 Specification.

Figure 4:
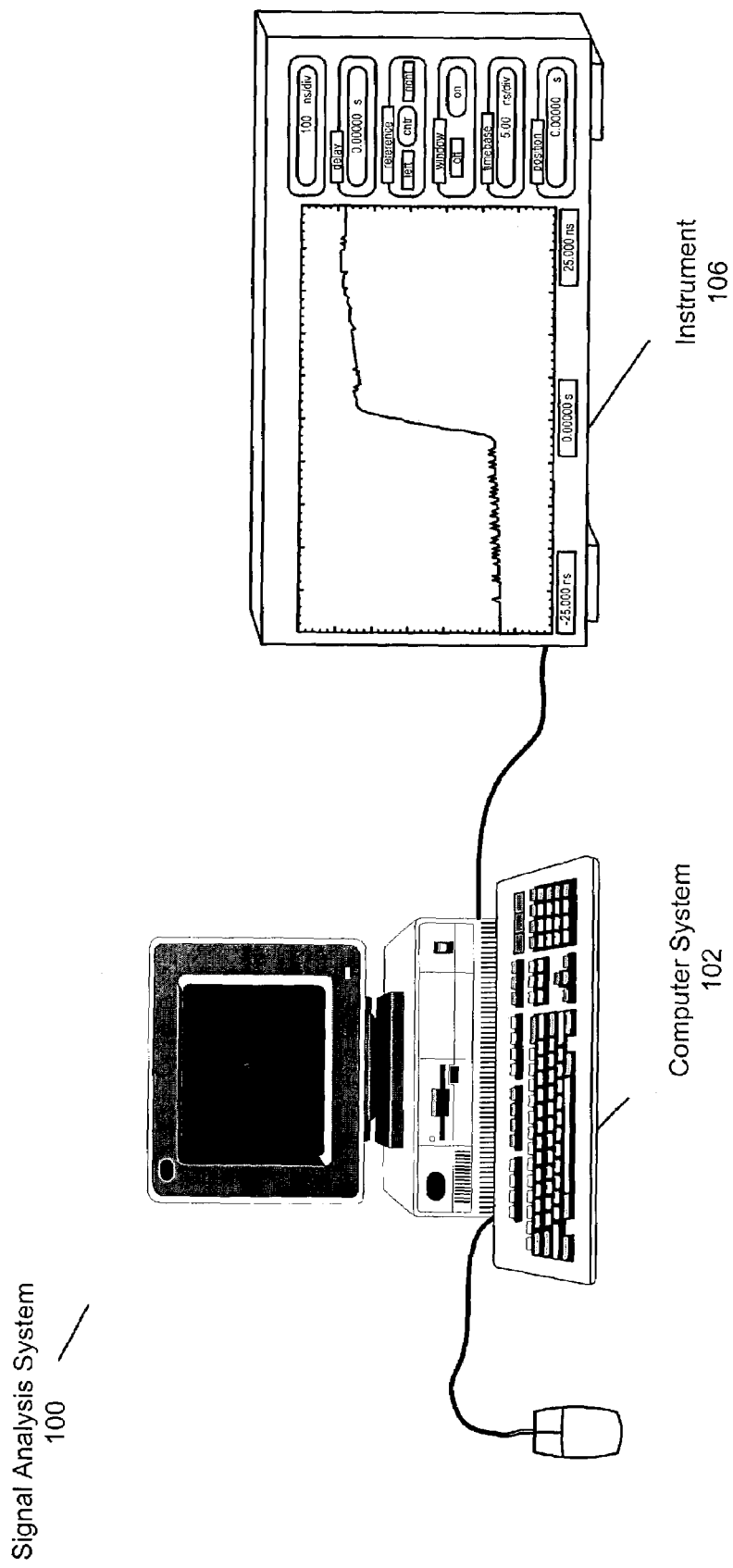
FIG. 4 illustrates a signal analysis system, according to one embodiment of the invention.

FIG. 4—Signal Analysis System

FIG. 4 illustrates a signal analysis system 100 which may be operable to perform signal analysis, according to one embodiment of the present invention. As FIG. 4 illustrates, the signal analysis system 100 may include a computer system 102 coupled to an instrument 106, e.g., an oscilloscope or digital sampler, via a bus, or over a network, such as the Internet. The computer system 102 may comprise one or more processors, a memory medium, display, an input device or mechanism, such as a keyboard or mouse, and any other components necessary for a computer system.

The instrument 106, e.g., the oscilloscope, may be operable to receive signals from a signal source, and generate signal data from the signals. Alternatively, the instrument 106 may generate the signals internally and produce signal data corresponding to the generated signals. In one embodiment, the signal data may comprise USB data, although other data protocols are also contemplated for use by various embodiments of the invention, such as, for example, Serial ATA and PCI-Express, among others.

The computer system 102 may include data acquisition (DAQ) and/or analysis hardware, such as a DAQ card (e.g., from National Instruments Corporation) installed in the computer system 102, or an external data acquisition device coupled to the computer system 102. The DAQ hardware may be operable to receive signal data from the instrument 106, e.g., in the form of digital signal data, and send the signal data to the memory medium of the computer system 102. The computer system 102 preferably includes one or more software programs executable to perform data processing and/or analysis on the received signal data, thereby producing signal analysis results characterizing one or more aspects of the signal. The software programs may be stored in the memory medium of the computer system 102.

The term "memory medium" is intended to include various types of memory, including an installation medium, e.g., a CD-ROM, or floppy disks 104, a computer system memory such as DRAM, SRAM, EDO RAM, Rambus RAM, etc., or a non-volatile memory such as a magnetic medium, e.g., a hard drive, or optical storage. The memory medium may comprise other types of memory as well, or combinations thereof. In addition, the memory medium may be located in a first computer in which the programs are executed, or may be located in a second different computer which connects to the first computer over a network. In the latter instance, the second computer may provide the program instructions to the first computer for execution. Also, the computer system 102 may take various forms, including a personal computer system, mainframe computer system, workstation, network appliance, Internet appliance, personal digital assistant (PDA), television system or other device. In general, the term "computer system" can be broadly defined to encompass any device having a processor which executes instructions from a memory medium.

The software program(s) may be implemented in any of various ways, including procedure-based techniques, component-based techniques, graphical programming techniques, and/or object-oriented techniques, among others. For example, the software program may be implemented using ActiveX controls, C++ objects, Java Beans, Microsoft Foundation Classes (MFC), or other technologies or methodologies, as desired. A CPU, such as the host CPU, executing code and data from the memory medium comprises a means for performing signal analysis according to the methods described below.

Figure 5:
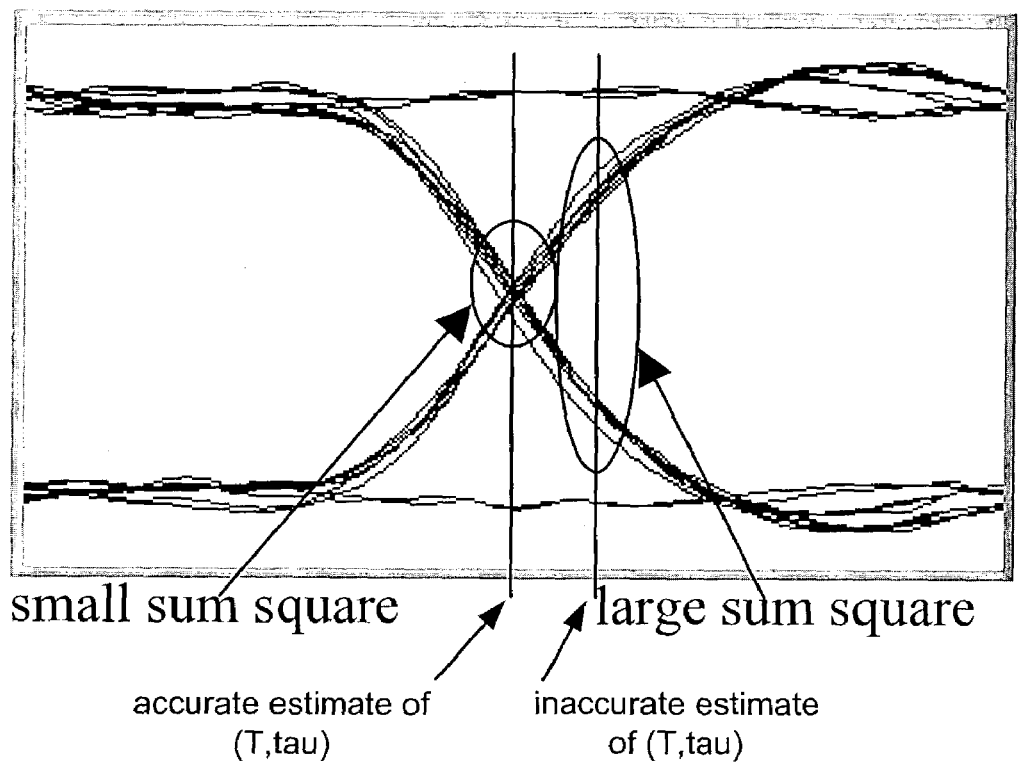
FIG. 5 illustrates an eye-diagram for analyzing high-speed digital communication signals with example estimation errors, according to one embodiment.

FIG. 5—Example Eye-Diagram

FIG. 5 illustrates an exemplary eye-diagram suitable for analyzing high speed digital communication signals, according to one embodiment. As FIG. 5 shows, the eye-diagram typically comprises a large number of overlaid signal traces or samples, such as may be produced by a high speed digital sampling oscilloscope, e.g., as provided by Agilent and Tektronics. In the field of digital communications the eye-diagram is used to visualize how the waveforms used to send multiple bits of data can potentially lead to errors in the interpretation of those bits, referred to as intersymbol interference (ISI). In general, the eye-diagram is an intuitive measure of ISI.

The eye-diagram is a geometrical representation of characteristic responses to a series of substantially square-wave signals or pulses, referred to as symbols, where a high pulse level generally signifies a '1' and a low pulse level signifies a '0'. Typically, the pulses are so fast that the sampling oscilloscope is only able to capture a relatively small number of samples for a given pulse, e.g., ~20, but possibly as low as 3, samples per symbol, and thus, a particular signal trace may only present a fraction of the pulse, such as a sample point (or a few sample points) from the rising portion of the pulse, while subsequent traces may present samples from other portions of other pulses. Over time, a great number of these traces or samples may illustrate all of the various transition forms of the pulses, i.e., rise times, fall times, low (0) and high (1) levels, etc.

As mentioned above, a number of signal characteristics may be determined from the eye-diagram, including rise time, fall time, jitter RMS (root mean square), jitter p-p, period, frequency, positive pulse width, negative pulse width, duty cycle, delta time, average power, crossing percentage, one level, zero level, eye height, eye width, signal to noise (Q-factor), duty cycle distortion, bit rate, eye amplitude, opening factor, and contrast ratio, as are well known in the art. These metrics or measurements may be used to design, test, diagnose, and/or calibrate data or communication devices and media, as is well known by those skilled in the art.

As also mentioned above, one exemplary use of an eye diagram relates to compliance testing, such as for compliance with the USB 2.0 specification (or any other high speed digital transmission protocol). With a USB 2.0 eye diagram, the test system may perform the measurement over individual USB data packets (e.g., 488 bits). After receiving test data from the oscilloscope, the data from each bit period (e.g., 2.0833 ns) may be overlaid to generate the eye diagram. As noted above, a single USB bit (a '0' or '1') is referred to as a symbol. The symbol period, denoted by T, of a signal refers to the number of samples in a measured pulse or waveform (a symbol), and is typically a real or floating point number. It is noted that this value of T is in units of samples, and that another form of T, referred to as the physical symbol rate or interval (period), is in units of seconds. The physical symbol rate or period may be determined by dividing T by the sampling frequency, $F_s$, in units of samples/s. The symbol rate of the signal is simply the inverse of the symbol period T.

In one embodiment, the digital signal may be a pulse amplitude modulated (PAM) signal. It should be noted that in the domain of high speed digital communication where bit rates are in or close to the G-baud range, or billions of bits per second, the pulses representing individual bits may not be well-formed square waves, and thus there may be substantial uncertainties or irregularities in each pulse's rising and falling edges.

In many cases, the first symbol in a received signal may be preceded by data that is not germane to the analysis, referred to as a preamble or offset. For example, the preamble may include "garbage" samples that reflect transient conditions, effects related to the initiation of the signal transmission, or even incomplete symbols captured by the initial samples. The number of samples in the preamble, i.e., before the first (complete) symbol, is denoted by τ (tau), and is referred to as the timing of the signal. It is further noted that this value of τ is in units of samples, and that another form of τ, referred to as the physical timing or offset, is in units of seconds. The physical timing or offset may be determined by dividing τ by the sampling frequency, $F_s$, in units of samples/s.

Usually a nominal symbol interval or period for a signal is known or can be roughly estimated by approximating the location of zero crossings of the original PAM waveform. As is well known in the art, the zero crossings of the signal are approximately half-way up or down the rising and falling pulse edges respectively. The method of rough estimation of the symbol interval is straight-forward and well known in the art, and so is not discussed herein. Thus, various embodiments of the present invention assume the nominal symbol period is known and, in effect, fine-tune the rough estimates to determine or estimate the actual symbol period and timing, as is described in detail below with reference to FIG. 6. As noted above, the symbol rate may then be determined by inverting the symbol period.

FIG. 5 also illustrates errors associated with two different estimates of T and τ. In the embodiment shown, a least squares technique has been used to determine amplitude errors at the estimated zero crossing points, where the accurate estimate results in a small sum square, and a poor or inaccurate estimate results in a large sum square. Thus, after each zero crossing, a symbol may immediately follow, referred to herein as a "zero-start" symbol. By considering the eye diagram at the area of all the zero crossings, the ideal location of each zero-start symbol may lead to the least-squares sum of interpolated signal values at that location. This is the criterion for estimating the T and τ. Further details of the estimation process are provided below.

Figure 6:
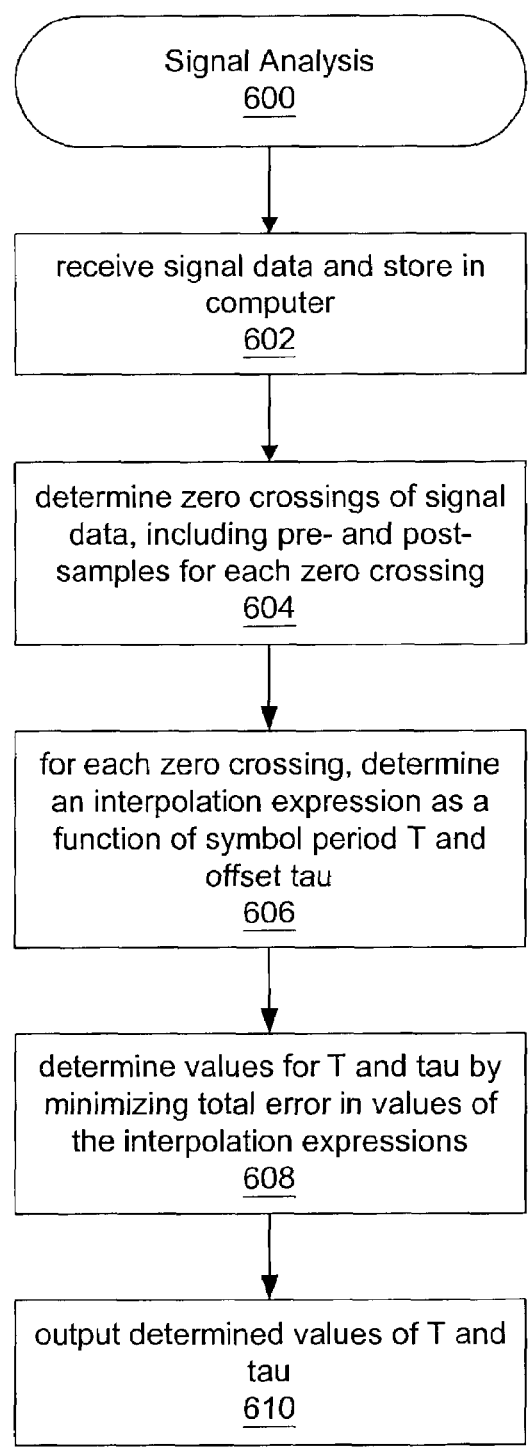
FIG. 6 flowcharts one embodiment of a method for performing signal analysis to estimate symbol rate and timing for a digital signal.

FIG. 6—Method for Estimating Symbol Period and Offset of a Digital Signal

FIG. 6 is a flowchart diagram illustrating one embodiment of a method for estimating symbol period T (and thus, the symbol rate) and offset τ for a digital signal. It is noted that in different embodiments, various of the steps described may occur concurrently, in a different order than shown, or may be omitted. Additional steps may also be performed as desired.

As FIG. 6 shows, in 602, a digital signal may be received and stored in a memory medium of a computer, such as computer system 102. The digital signal is preferably a PAM waveform, and may comprise a plurality of samples. The digital signal may include a plurality of binary symbols, e.g., 1s and 0s, where, as described above, each symbol is represented by a high (1) or low (0) pulse. For example, in one embodiment, s[M] may be an array of M samples representing the digital signal, where each sample s[i] is a measured (sampled) amplitude of the signal. The samples may be generated from an original analog signal by an A/D converter or high-speed digital sampler, as is well known in the art. In one embodiment, the digital signal comprises USB signal data, although other digital communication protocols are also contemplated.

Figure 2:
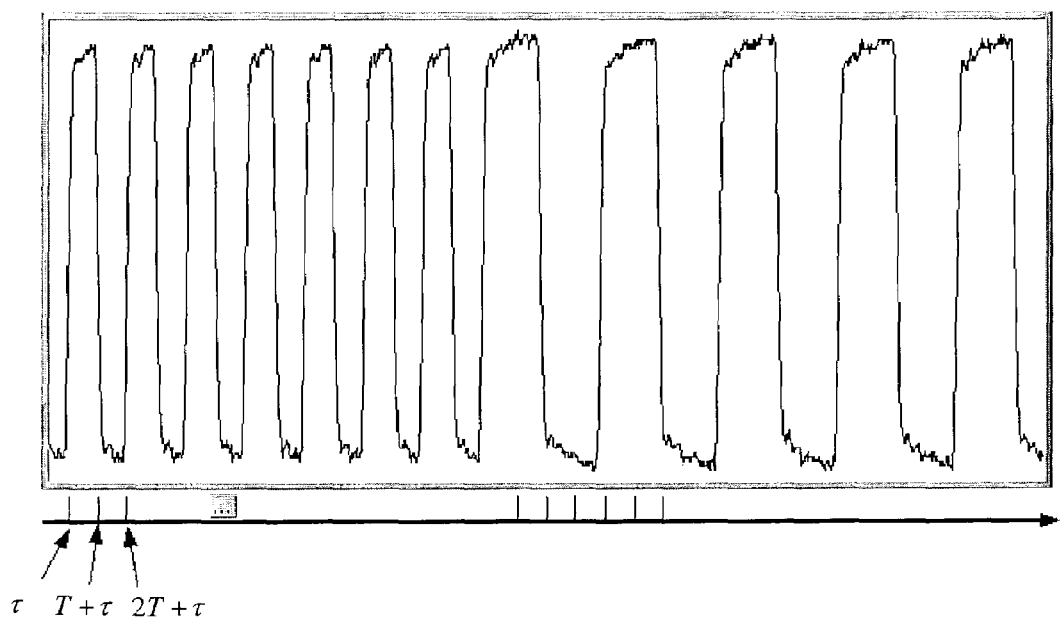
FIG. 2 illustrates exemplary symbol timing and offset for a digital communications signal, according to the prior art.
Figure 3A:
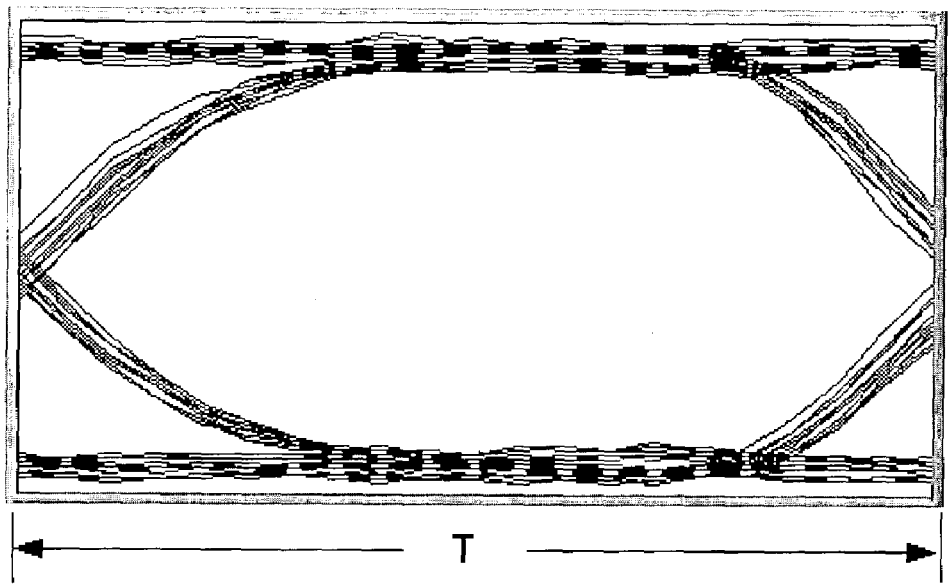
FIGS. 3A and 3B illustrate exemplary eye diagrams with accurate and inaccurate estimations of symbol period and offset, respectively, according to the prior art.
Figure 3B:
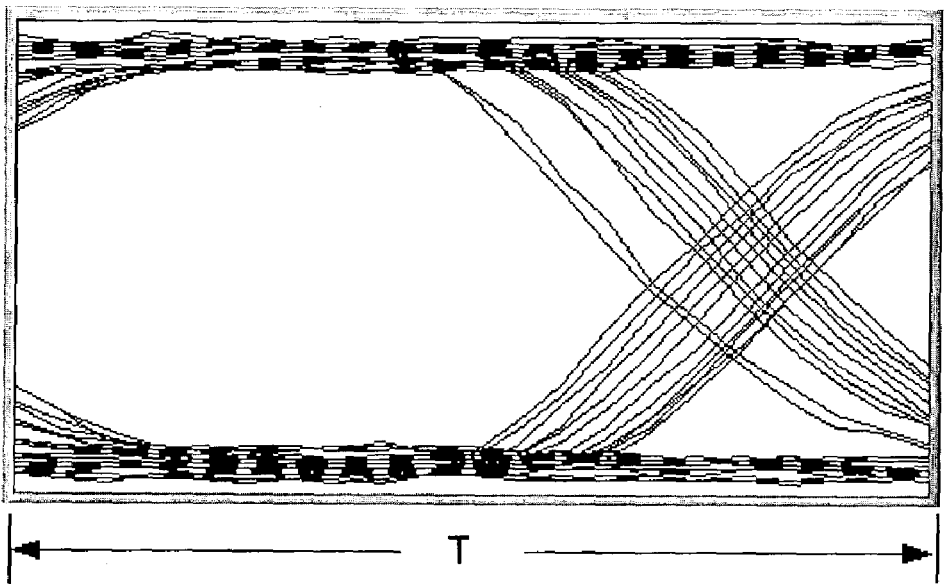

In 604, a plurality of zero crossings of the digital signal may be determined, where each of the plurality of zero crossings includes a respective first sample, immediately preceding the zero crossing, and a respective second sample, immediately following the zero crossing. Thus, for a given zero crossing, if the preceding sample is s[i], the following sample is s[i+1]. As noted above with reference to FIG. 2, in a preferred embodiment, T is the nominal symbol period or interval (unit interval) for a symbol (0 or 1) in terms of number of samples, and may be a floating-point value (e.g., T=52.08 samples). As also noted above, τ is the offset from the beginning of s[i] to the first symbol in terms of number of samples, and may also be a floating-point value. Thus, τ may be considered to be the starting point of the first symbol of the digital signal. It should be noted that in some embodiments, τ can be a negative number (e.g., if s[i] starts in the middle of a symbol). In the case of τ being negative, τ may be adjusted by adding T. Thus, as described above, the zero crossing point for each high-low or low-high transition between symbols is roughly an integral multiple of T with an offset of τ, i.e., nT+τ, where n counts the successive symbols. It is noted that when adjacent symbols have the same value, e.g., 0,0 or 1,1, there is not a zero crossing point between them.

Then, in 606, Then, for each of the plurality of zero crossings, an error expression may be determined, where the error expression computes an error between the nominal or intended zero crossings and the actual values interpolated from the first sample and the second sample as a function of an estimated period T and an estimated offset τ of the digital signal. As is well known in the art, there are various approaches for interpolating between two points. In a preferred embodiment, a simple linear interpolation may be used. Thus, each error expression may be used to compute an error as a function of the estimated period T and offset τ. For example, considering signal amplitude to be along a y-axis and time or samples to be along an x-axis, in one embodiment, the error expression may compute an error in the interpolated amplitude of the signal at the nominal or estimated zero crossing point, i.e., the error along the y-axis (amplitude) of the signal. In another embodiment, the error expression may compute an error in the interpolated zero crossing point, i.e., the error along the x-axis (time or samples) of the signal.

As an example of one implementation, let $N_z$ be the number of zero crossings and let index j refer to each zero crossing: j=0 . . . $N_z$–1. Two $N_z$-length arrays, a[$N_z$] and b[$N_z$] contain values from s[i] that bracket each zero crossing. Let a[j] be the value from s[i] that immediately precedes the jth zero crossing, and b[j] contain the value of s[i] that immediately follows the jth zero crossing.

Additionally, let symbol index array n[j] hold the symbol number (index) at the zero crossing corresponding to the bracket values a[j] and b[j]. In other words, the zero-start symbol immediately after the jth zero crossing is the n[j]th symbol of all the symbols covered by s[i]. Let array idx_a [$N_z$] store the indices of the a[j] samples, i.e., each jth element of idx_a[$N_z$] contains the index into s[i] corresponding to the first bracket value a[j], such that a[j]=s[idx_a[j]]. It should be noted that b[j]=s[idx_a[j]+1].

Now, assuming a linear model for T and τ of the form:

$$y=Tx+\tau, \quad (1)$$

where y represents the ideal zero crossing time location, and x represents the symbol count, an expression for the error between nominal values of the zero crossings and actual values determined from the data, e.g., via linear interpolation of a[j] and b[j] at location n[j]*T+τ, may be determined. In one embodiment, the error term alpha for the n[j]th symbol is:

$$alpha[j]=(b[j]-a[j])*(n[j]*T+\tau-idx\_a[j]+a[j]/(b[j]-a[j])) \quad (2)$$

where alpha[j] denotes the value of the original waveform at time n[j]*T+τ. Note that this error expression has the same form as a weighted linear fit expression, and thus, a weighted linear fit algorithm may be used to solve for T and τ such that the error alpha is minimized, e.g., by minimizing the square of alpha, the absolute value of alpha, etc., as is well known in the art.

It should be noted that in another embodiment, the error expression may assume the form:

$$alpha[j]=n[j]*T+\tau-idx\_a[j]+a[j]/(b[j]-a[j]) \quad (3)$$

where the weighting term (b[j]–a[j]) is omitted. In this embodiment, alpha[j] denotes the error in the estimated zero crossing point on the x-axis. A linear fit algorithm may be used to solve for T and τ such that the error alpha is minimized, as is well known to those skilled in the art.

Once the error expressions for each zero crossing have been determined, then in 608, values of T and τ may be determined (based on the error expressions) that minimize a total error of values of the error expressions, e.g., by using a weighted linear fit solution algorithm. It is noted that there is a wide variety of criteria which may be used to compute the total error, including, but not limited to, median fit, weighted linear fit, and linear least squares regression among other robust estimation techniques, as is well known from the field of estimation theory.

For example, in an embodiment using a weighted linear fit, the sum of squares of the distance from the interpolated value at n[j]*T+τ to the x-axis may be minimized. In other words, T and τ may be chosen such that $\Sigma(alpha^2)$ is minimized. As is well known by those skilled in the art, this may be accomplished by summing the squares of the expressions (alphas), setting the partial derivatives of the sum of squares expression (with respect to T and τ, respectively) equal to zero, and solving for T and τ algebraically. Standard equations for any of a variety of minimization techniques are readily available from standard references.

As noted above, the values of T and τ are in time units of samples. Thus, if desired, the values of T and τ may be divided by a sampling frequency of waveform s[i], $F_s$ in units of samples/s, to compute physical time-based values of said T and said τ. In other words, the units of T and τ may be converted from samples to seconds thusly:

symbol period or interval (s)=$T/F_s$ time offset or delay (s)=$\tau/F_s$. (4)

Finally, in 610, the determined values of T and τ may be output, where the determined values of T and τ are usable in analyzing the digital signal. For example, the values of T and τ may be output to a display, a log, a memory location, or to an external system, such as a device or other external computer coupled to the computer system 102.

In one embodiment, the symbol rate for the signal, which is simply the inverse of the period T, may be determined thusly:

symbol rate=1/T (5)

where the units are per sample or per second, depending on the units of T.

As mentioned above, each zero crossing corresponds to a respective symbol of the plurality of symbols. Thus, if substantially accurate values of T and τ are known, the waveform s[i] may be partitioned or broken into segments, starting at τ, with each segment having a duration of T. Each respective symbol is thus represented by a respective segment of the digital signal. In one embodiment, each respective segment may be overlaid based on the determined values of T and τ to form an eye diagram, where the eye diagram is usable to analyze the digital signal. In other words, when each T-length segment is plotted on the same graph, an eye-diagram of the modulated signal may be generated, as illustrated above with reference to FIGS. 1, 3A, 3B, and 5.

As is well known, the resultant eye diagram may be used to compute such attributes of the digital signal as rise time, fall time, jitter RMS (root mean square), jitter p-p, period, frequency, positive/negative pulse width, duty cycle, duty cycle distortion, delta time, extinction ratio, average power, crossing percentage, one/zero levels, eye height, width, and amplitude, Q-factor, bit rate, opening factor, and contrast ratio, among others.

Various embodiments further include receiving or storing instructions and/or data implemented in accordance with the foregoing description upon a carrier medium. Suitable carrier media include a memory medium as described above, as well as signals such as electrical, electromagnetic, or digital signals, conveyed via a communication medium such as networks and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

I claim:

1. A method for analyzing digital signals, the method comprising:
   receiving a digital signal, wherein the digital signal encodes a plurality of binary symbols;
   sampling the digital signal to generate a plurality of samples that represent the digital signal;
   determining a plurality of zero crossings of the digital signal, wherein each of the plurality of zero crossings is determined by a respective first sample and a respective second sample, wherein the first sample immediately precedes the zero crossing, and wherein the second sample immediately follows the zero crossing;
   for each of the plurality of zero crossings, determining an error expression, wherein the error expression computes an error of an interpolated value from the first sample and the second sample as a function of an estimated symbol period T and an estimated offset $\tau$ of the digital signal, wherein $\tau$ denotes a preamble of the signal that precedes the plurality of symbols;
   determining values of T and $\tau$ based on said error expressions using a linear fit that minimizes a total error of values of said error expressions; and
   storing said determined values of T and $\tau$, wherein said determined values of T and $\tau$ are usable in analyzing the digital signal.

2. The method of claim 1, wherein the digital signal comprises Universal Serial Bus (USB) signal data.

3. The method of claim 1, wherein the digital signal comprises a binary pulse amplitude modulated (PAM) signal.

4. The method of claim 1, wherein said linear fit comprises one or more of:
   a least squares linear fit;
   a median linear fit;
   a weighted linear fit;
   a weighted least squares linear fit; and
   a weighted median linear fit.

5. The method of claim 1, further comprising:
   determining a symbol rate for the signal based on said determined value of T.

6. The method of claim 1, wherein said values of said error expressions comprise:
   interpolated amplitude values corresponding to said values of said T and said $\tau$.

7. The method of claim 1, wherein said values of said error expressions comprise:
   interpolated zero crossing values corresponding to said values of said T and said $\tau$.

8. The method of claim 1, wherein said values of said T and said $\tau$ are in time units of samples, the method further comprising:
   dividing said values of said T and said $\tau$ by a sampling frequency of the digital signal to compute physical time-based values of said T and said $\tau$.

9. The method of claim 1, wherein each zero crossing corresponds to a respective symbol of said plurality of symbols, and wherein each respective symbol is represented by a respective segment of said digital signal, the method further comprising:
   overlaying each respective segment based on said determined values of said T and said $\tau$ to form an eye diagram, wherein said eye diagram is usable to analyze the digital signal.

10. A system for analyzing digital signals, the system comprising:
    a processor;
    a memory medium coupled to the processor;
    an input coupled to the processor and the memory medium; and
    a digital sampler coupled to the input;
    wherein the digital sampler is operable to:
      receive a digital signal, wherein the digital signal encodes a plurality of binary symbols; and
      sample the digital signal to generate a plurality of samples that represent the digital signal;
    wherein the input is operable to:
      receive the plurality of samples;
    wherein the memory medium stores a program instructions which are executable by the processor to:
      determine a plurality of zero crossings of the digital signal, wherein each of the plurality of zero crossings is determined by a respective first sample and a respective second sample, wherein the first sample immediately precedes the zero crossing, and wherein the second sample immediately follows the zero crossing;
      for each of the plurality of zero crossings, determine an error expression, wherein the error expression computes an error of an interpolated value from the first sample and the second sample as a function of an estimated period T and an estimated offset $\tau$ of the digital signal;
      determine values of T and $\tau$ based on said error expressions using a linear fit that minimizes a total error of values of said error expressions; and
      store said determined values of T and $\tau$, wherein said determined values of T and $\tau$ are usable in analyzing the digital signal.

11. The system of claim 10, wherein the digital signal comprises USB signal data.

12. The system of claim 10, wherein the digital signal comprises a binary pulse amplitude modulated (PAM) signal.

13. The system of claim 10, wherein said linear fit comprises one or more of:
    a least squares linear fit;
    a median linear fit;
    a weighted linear fit;
    a weighted least squares linear fit; and
    a weighted median linear fit.

14. The system of claim 10, wherein said values of said error expressions comprise:
    interpolated amplitude values corresponding to said values of said T and said $\tau$.

15. The system of claim 10, wherein said values of said error expressions comprise:
    interpolated zero crossing values corresponding to said values of said T and said $\tau$.

16. The system of claim 10, wherein said values of said T and said $\tau$ are in time units of samples, wherein the program instructions are further executable to:
    divide said values of said T and said $\tau$ by a sampling frequency of the digital signal to compute physical time-based values of said T and said $\tau$.

17. The system of claim 10, wherein each zero crossing corresponds to a respective symbol of said plurality of symbols, and wherein each respective symbol is represented by a respective segment of said digital signal, wherein the program instructions are further executable to:
    overlay each respective segment based on said determined values of said T and said $\tau$ to form an eye diagram, wherein said eye diagram is usable to analyze the digital signal.

18. The system of claim 10, wherein the program instructions are further executable to:
 determine a symbol rate of the signal based on said determined value of T.

19. A system for analyzing digital signals, the system comprising:
 means for receiving a digital signal, wherein the digital signal encodes a plurality of binary symbols;
 means for sampling the digital signal to generate a plurality of samples that represent the digital signal;
 means for determining a plurality of zero crossings of the digital signal, wherein each of the plurality of zero crossings is determined by a respective first sample and a respective second sample, wherein the first sample immediately precedes the zero crossing, and wherein the second sample immediately follows the zero crossing;
 means for, for each of the plurality of zero crossings, determining an error expression, wherein the error expression computes an error of an interpolated value from the first sample and the second sample as a function of an estimated symbol period T and an estimated offset $\tau$ of the digital signal, wherein $\tau$ denotes a preamble of the signal that precedes the plurality of symbols;
 means for determining values of T and $\tau$ based on said error expressions using a linear fit that minimizes a total error of values of said error expressions; and
 means for storing said determined values of T and $\tau$, wherein said determined values of T and $\tau$ are usable in analyzing the digital signal.

20. A computer accessible memory medium which stores program instructions for analyzing digital signals, wherein the program instructions are executable by a processor to perform:
 receiving a digital signal, wherein the digital signal encodes a plurality of binary symbols;
 sampling the digital signal to generate a plurality of samples that represent the digital signal;
 determining a plurality of zero crossings of the digital signal, wherein each of the plurality of zero crossings is determined by a respective first sample and a respective second sample, wherein the first sample immediately precedes the zero crossing, and wherein the second sample immediately follows the zero crossing;
 for each of the plurality of zero crossings, determining an error expression, wherein the error expression computes an error of an interpolated value from the first sample and the second sample as a function of an estimated symbol period T and an estimated offset $\tau$ of the digital signal, wherein $\tau$ denotes a preamble of the signal that precedes the plurality of symbols;
 determining values of T and $\tau$ based on said error expressions using a linear fit that minimizes a total error of values of said error expressions; and
 storing said determined values of T and $\tau$, wherein said determined values of T and $\tau$ are usable in analyzing the digital signal.

* * * * *